(12) United States Patent
Mihan et al.

(10) Patent No.: US 6,803,431 B1
(45) Date of Patent: Oct. 12, 2004

(54) METHOD FOR THE POLYMERIZATION OF OLEFINS

(75) Inventors: Shahram Mihan, Ludwigshafen (DE); Dieter Lilge, Limburgerhof (DE); Günther Schweier, Friedelsheim (DE); Randolf Köhn, Bath (GB); Guido Seifert, Berlin (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/937,844

(22) PCT Filed: Mar. 17, 2000

(86) PCT No.: PCT/EP00/02383

§ 371 (c)(1),
(2), (4) Date: Sep. 28, 2001

(87) PCT Pub. No.: WO00/58369

PCT Pub. Date: Oct. 5, 2000

Related U.S. Application Data

(63) Continuation-in-part of application No. 09/277,823, filed on Mar. 29, 1999, now abandoned.

(30) Foreign Application Priority Data

May 14, 1999 (DE) .......................... 199 22 048
Jul. 30, 1999 (DE) .......................... 199 35 407

(51) Int. Cl.$^7$ .............................. C08F 4/622
(52) U.S. Cl. ................. 526/161; 502/103; 502/162; 502/167; 526/165; 526/172
(58) Field of Search ................ 502/103, 162, 502/167, 118; 526/161, 165, 172, 160

(56) References Cited

FOREIGN PATENT DOCUMENTS

| EP | 420436 | 4/1991 |
|---|---|---|
| EP | 427697 | 5/1991 |
| EP | 468537 | 1/1992 |
| EP | 608 447 | 8/1994 |
| EP | 416 815 | 8/1997 |
| WO | 97/07123 | 2/1997 |
| WO | 97/36937 | 10/1997 |
| WO | 98/03559 | 1/1998 |
| WO | 98/27124 | 6/1998 |

OTHER PUBLICATIONS

Britovsek et al., *Angew. Chemie.*, 1999, 111, 448–468 (=*Angew. Chem. Int. Ed.*, 1998, 38, 428–447).
Wang et al., *Organomet.*, 15, 1996, 491–498.
Stahley et al., *Acta Crystall.*, C51, 1995, 18–20.
Kaden, *Topics Curr. Chem.*, 121, 1984, 157–179.
Strauss, *Chem. Rev.*, 1993, 93, 927–942.
Weitl et al., *JACS*, 101, 1979, 2728.
Takahashi et al., *Bull. Chem. Soc. Japan*, 50, 1977, 3413.
Christiansen et al., *Inorg. Chem.*, 25, 1986, 2813.
Gahan et al., *Aust. J. Chem.*, 35, 1982, 1119.
Sayer et al. *Inorg. Chim. Acta*, 77, 1983, L63.
Weighardt et al., *Z. Naturforsch.*, 38b, 1983, 81.
Fallis et al. *Chem. Commun.*, 1998, 665–667.
Chaudhuri et al., *Prog. Inor. Chem.*, 35, 1987, 329.
Kazuhide et al., *Chem. Abst.*, vol. 129, No. 18, 1998.
Farrugia, *Polyhedron*, 14(4), 1995, 541–545.

*Primary Examiner*—Caixia Lu
(74) *Attorney, Agent, or Firm*—Keil & Weinkauf

(57) ABSTRACT

The polymerization of olefins is carried out in the presence of catalysts comprising at least one complex of a transition metal with a tridentate macrocyclic ligand which additionally bears at least one functional substituent and, if desired, one or more activator compounds. A catalyst system comprising at least one transition metal complex as set forth above and at least one activator compound is also provided.

11 Claims, No Drawings

METHOD FOR THE POLYMERIZATION OF OLEFINS

This application is a continuation of Ser. No. 09/277,823 filed Mar. 29, 1999, abandoned.

The present invention relates to a process for the polymerization of olefins and to a catalyst system suitable for this purpose.

Catalyst systems having a uniquely defined, active center, known as single-site catalysts, are gaining increasing importance in the polymerization of olefins. These catalyst systems lead to polymers having narrow molecular weight distributions, which results in particularly favorable mechanical properties. Among these single-site catalysts, the metallocene catalysts have hitherto achieved particular industrial importance. Appropriate substitution on the cyclopentadienyl ligands of these can influence the polymer properties. However, many metallocene catalysts can be obtained only by multistage syntheses and therefore represent a considerable cost factor in olefin polymerization.

Substituted and unsubstituted triazacycloalkanes having different ring sizes have been known for a long time. Many of them can be prepared simply and inexpensively. These ligands also coordinate well to metal ions to form stable complexes of which some possess unusual chemical and physical properties. Of particular interest here is the high stability of these coordinated ligands—an important aspect in the selection of suitable ligand systems for potential polymerization-active complexes (G. J. P. Britovsek, V. C. Gibson, D. F. Wass, Angew. Chem. 1999, 111, 448–468). Thus, it is known that N,N'N"-trialkyl-1,4,7-triazacyclononanerhodium compounds (Wang and Flood, Organomet. 15, (1996), 491–498) and -chromium compounds (G. P. Stahley et al., Acta Crystall. C51, (1995), 18–20) will polymerize or oligomerize ethene. However, the polymerization rate is very low.

Introduction of donor-functionalized side chains which bind intramolecularly to the transition metal into these triazacycloalkane ligands enables the properties of the corresponding metal.complexes to be significantly altered. Thus, a change in the redox potential or the coordination behavior of further ligands has been observed as a result (T. Kaden, Topics Curr. Chem. 121, (1984), 157–179). Complexes of this type have hitherto not been used for the polymerization of olefins.

It is an object of the present invention to find a process for the polymerization of olefins which is based on a catalyst system which has good polymerization activity and is simple to prepare and to modify.

We have found that this object is achieved by a process for the polymerization of olefins, which comprises carrying out the polymerization in the presence of catalysts comprising the following components:

(A) at least one complex of a transition metal with a tridentate macrocyclic ligand which bears at least one substituent having a donor function and (B) if desired, one or more activator compounds.

Furthermore, we have found a catalyst system comprising the following components:

a) at least one transition metal complex (A) as set forth above and b) at least one activator compound (B).

The tridentate macrocyclic ligand can be bound to the transition metal via nitrogen, phosphorus, oxygen or sulfur. The donor function can be uncharged or anionic and contain a heteroatom of groups 15–16 of the Periodic Table (as defined in IUPAC proposal of 1985) or be a carbanion. The donor is joined to the macrocyclic ligand via a bridge, so that from 1 to 8, preferably from 1 to 3, bridge members which comprise carbon or silicon and may be substituted form the direct linkage, but not more than two silicon atoms are in each case adjacent to one another. The functional substituent can be uncharged or anionic. If it is uncharged, it can be bound coordinatively to the transition metal center M or may not coordinate. It is preferably coordinated to the metal center M. If the functional substituent is formally anionic, it is covalently bound to the metal center. The bonds can be intramolecular or intermolecular, preferably intramolecular. During the polymerization, it may also be possible for one or more of the functional substituents to bind coordinatively or covalently to the activator compound.

In one embodiment of the process of the invention, the transition metal complex (A) used is a compound of the formula I

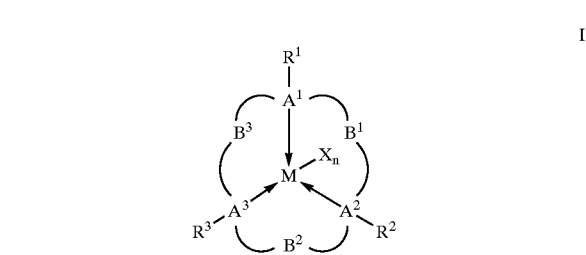

where the variables have the following meanings:

is a transition metal of groups 3 to 12 of the Periodic Table, $B^1$–$B^3$ are each a divalent radical selected from the group consisting of

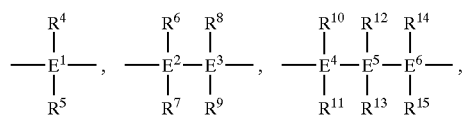

where $E^1$–$E^6$ are silicon or carbon and not more than two of $E^4$–$E^6$ are silicon, $A^1$–$A^3$ are nitrogen or phosphorus, $R^1$–$R^{15}$ are hydrogen, $C_1$–$C_{20}$-alkyl, 5- to 7-membered cycloalkyl which may in turn bear a $C_6$–$C_{10}$-aryl group as substituent, $C_2$–$C_{20}$-alkenyl, $C_6$–$C_{10}$-aryl, alkylaryl having from 1 to 10 carbon atoms in the alkyl part and 6–20 carbon atoms in the aryl part, $SiR^{32}_3$ or a radical of the formula —Z—D, where the organic radicals $R^1$–$R^{15}$ may be substituted by halogen(s) and any two geminal or vicinal radicals $R^1$–$R^{15}$ may also be joined to form a five- or six-membered ring, and at least one of the radicals $R^1$–$R^{15}$ is a radical —Z—D, where D is a functional group having the following meanings:

D is $NR^{16}R^{17}$, $NR^{16}$, $OR^{16}$, $SR^{16}$, S, $PR^{16}R^{17}$, $SO_3R^{16}$, $OC(O)R^{16}$, $CO_2$, $C(O)R^{16}$, $C(NR^{16})R^{17}$, CN or a five- or six-membered heterocyclic ring system, where the radicals $R^{16}$–$R^{17}$ may also be joined to Z to form a five- or six-membered ring;

Z is a divalent radical selected from the group consisting of:

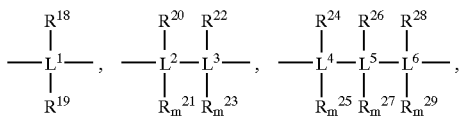

where

L$^1$–L$^6$ are silicon or carbon, not more than two of L$^4$–L$^6$ are silicon and m=0 if any two of the vicinal radicals R$^{20}$, R$^{22}$, R$^{24}$, R$^{26}$ and R$^{28}$ form an aromatic ring or a double bond is formed between two adjacent L$^2$–L$^6$, and otherwise m=1, X are, independently of one another, fluorine, chlorine, bromine, iodine, hydrogen, C$_1$–C$_{10}$-alkyl, C$_2$–C$_{10}$-alkenyl, C$_6$–C$_{20}$-aryl, alkylaryl having 1–10 carbon atoms in the alkyl part and 6–20 carbon atoms in the aryl part, NR$^{30}$R$^{31}$, OR$^{30}$, SR$^{30}$, SO$_3$R$^{30}$, OC(O)R$^{30}$, CN, SCN, =O, β-diketonate, BF$_4$-, PF$_6$- or bulky non-coordinating anions, R$^{16}$–R$^{31}$ are hydrogen, C$_1$–C$_{20}$-alkyl, 5- to 7-membered cycloalkyl which may in turn bear a C$_6$–C$_{10}$-aryl group as substituent, C$_2$–C$_{20}$-alkenyl, C$_6$–C$_{20}$-aryl, alkylaryl having from 1 to 10 carbon atoms in the alkyl part and 6–20 carbon atoms in the aryl part, SiR$^{32}$$_3$, where the organic radicals R$^{16}$–R$^{31}$ may be substituted by halogen(s) and any two geminal or vicinal radicals R$^{16}$–R$^{31}$ may also be joined to form a five- or six-membered ring, R$^{32}$ are, independently of one another, hydrogen, C$_1$–C$_{20}$-alkyl, 5- to 7-membered cycloalkyl which may in turn bear a C$_6$–C$_{10}$-aryl group as substituent, C$_2$–C$_{20}$-alkenyl, C$_6$–C$_{20}$-aryl, alkylaryl having from 1 to 10 carbon atoms in the alkyl part and 6–20 carbon atoms in the aryl part and any two geminal radicals R$^{32}$ may also be joined to form a five- or six-membered ring, n is a number from 1 to 4 which corresponds to the oxidation state of M or, if D is covalently bound to the metal center M, the oxida ion state of M minus the number of groups D covalently bound to M, and, furthermore, the value of n is reduced by 1 for each X=oxygen.

Preference is here given to compounds in which A$^1$, A$^2$ and A$^3$ are each a nitrogen atom.

The bridges B$^1$–B$^3$ connecting A$^1$–A$^3$ can influence the activity and molecular weight by means of a change in the ring size. Here, B$^1$–B$^3$ are formed by a carbon- and/or silicon-containing divalent organic radical having a chain length of from 1 to 3. B$^1$–B$^3$ are preferably identical. Compounds in which B$^1$–B$^3$ are either a divalent CR$^4$R$^5$ or CR$^6$R$^7$–CR$^8$R$^9$ radical can be prepared very simply and are therefore preferred. Very particular preference is given to R$^4$–R$^9$ being hydrogen atoms.

Varying the substituents R$^1$–R$^{15}$ on the tridentate macrocycle also allows various properties of the catalyst system to be altered. The number and type of the substituents can influence the accessibility of the metal atom M to the olefins to be polymerized. This makes it possible to modify the activity and selectivity of the catalyst in respect of various monomers, in particular bulky monomers. Since the substituents can also influence the rate of termination reactions of the growing polymer chain, this also enables the molecular weight of the polymers formed to be altered. The chemical structure of the substituents R$^1$ to R$^{15}$ can therefore be varied within a wide range in order to achieve the desired results and to obtain a tailored catalyst system. Examples of suitable carboorganic substituents are: C$_1$–C$_{20}$-alkyl, which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a C$_6$–C$_{10}$-aryl group as substituent, e.g. cyclopropane, cyclobutane, cyclopentane, cyclohexane, cycloheptane, cyclooctane, cyclononane or cyclododecane, C$_2$–C$_{20}$-alkenyl, which may be linear, cyclic or branched and have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, C$_6$–C$_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4, 5-trimethylphenyl, or arylalkyl which may bear further alkyl groups as substituents, e.g. benzyl, o-, m-, p-methylbenzyl, 1- or 2-ethylphenyl, where two R$^1$ to R$^{15}$ may also be joined to form a 5- or 6-membered ring and the organic radicals R$^1$–R$^{15}$ may also be substituted by halogens such as fluorine, chlorine or bromine. In the case of organosilicon substituents SiR$^{32}$$_3$, suitable radicals R$^{32}$ are the same radicals as have been set forth in more detail above for R$_1$–R$^{15}$, where two R$^{32}$ may also be joined to form a 5- or 6-membered ring, for example trimethylsilyl, triethylsilyl, butyldimethylsilyl, tributylsilyl, triallylsilyl, triphenylsilyl or dimethylphenylsilyl.

According to the present invention, at least one of these radicals RL–R$^{15}$ has to be a radical —Z—D. The donor function D is covalently bound to the metal center M when D is anionic (e.g. an amide, alkoxide or thiolate). If the donor function is uncharged, it can be bound coordinatively to the metal center M or may not coordinate. If a plurality of donor functions D are present, one or more of these can be bound intramolecularly to the metal center M. Preferably, at least one D is bound intramolecularly to the metal center M. If a plurality of donor functions D are present and these are covalently bound intramolecularly to the transition metal M, their maximum number is given by the oxidation state of the metal center minus 1 (since n is at least 1). The number of radicals —Z—D is preferably one or two and very particularly preferably one.

Particularly for preparing polyethylene or for preparing copolymers of ethylene with higher α-olefins, it is advantageous to use macrocyclic ligands having simple substitution patterns. In a preferred embodiment, in which the ligand is also simple to prepare, from one to three radicals R$^2$–R$^3$ can be —Z—D. Particularly preferably, only R$^1$ is a radical —Z—D. The remaining radicals R$^2$–R$^3$ are in this case preferably hydrogen, methyl, ethyl, n-propyl, isopropyl, n-butyl, isobutyl, tert-butyl, n-pentyl, n-hexyl, n-heptyl, n-octyl, allyl, benzyl, phenyl, ortho-dialkyl- or ortho-dichloro-substituted phenyls, trialkyl- or trichloro-substituted phenyls, naphthyl, biphenyl and anthranyl. Particularly suitable organosilicon substituents are trialkylsilyl groups having from 1 to 10 carbon atoms in the alkyl radical, in particular trimethylsilyl groups.

As in the case of the metallocenes, the transition metal complexes may be chiral. Thus, the ligand may have one or more chiral centers or else the ligand itself may be only prochiral so that chirality is induced only by it being bound to the transition metal H. This can be achieved readily by, for example, unsymmetrical substitution of the atoms A. Three different nonchiral substituents R$^1$–R$^3$ are sufficient to enable R and S enantiomers of the transition metal complexes to be obtained. D together with the radical Z bearing it may form an amide $NR^{16}$, amine $NR^{16}R^{17}$, ether $OR^{16}$, alkoxide O, thiolate S, thioether $SR^{16}$, phosphine $PR^{16}R^{17}$, sulfonyl $SO_3R^{16}$, carboxylate $CO_2$, carboxylic ester $OC(O)R^{26}$, ketone $C(O)R^{16}$, imine $C(NR^{16})R^{17}$, nitrile CN or a five- or six-membered heterocyclic ring system such as pyridine, pyrimidine, quinoline, imidazole, pyrrole, pyrazole, indole, furan or thiophene. The naming as an anionic group, e.g. alkoxide or amide, was chosen because in this case the group binds to the transition metal. Because they are simple to prepare, preference is given to amide, alkoxide, ether, carboxylate and pyridine. Particular preference is given to using metal complexes in which D is oxygen, $NR^{16}$, $NR^{16}R^{17}$ or CN. Appropriate selection of the radicals $R^{16}$ and $R^{17}$ can likewise exert an influence on the activity of the catalyst and on the molecular weight of the polymer formed. Suitable carboorganic substituents $R^{16}$ and $R^{17}$ are the same radicals as described for $R^1$–$R^{15}$ (apart from —Z—D), where two radicals $R^{16}$ and $R^{17}$ may also be joined to form a 5- or 6-membered ring and may also be substituted by halogens such as fluorine, chlorine or bromine. Preferred radicals $R^{16}$ and $R^{17}$ are methyl, ethyl, n-propyl, n-butyl, tert-butyl, n-pentyl, n-hexyl, n-heptyl, n-octyl, vinyl, allyl, benzyl, phenyl, ortho-dialkyl- and ortho-dichloro-substituted phenyls, ortho- and para-trialkyl- and trichloro-substituted phenyls, naphthyl, biphenyl and anthranyl. Particularly suitable organosilicon substituents are trialkylsilyl groups having from 1 to 10 carbon atoms in the alkyl radical, in particular trimethylsilyl groups.

The bridge Z between the macrocycle and the functional group D is a divalent organic radical comprising carbon and/or silicon units and having a chain length of from 1 to 3. Altering the chain length can influence the activity of the catalyst. Thus, for example, the ability of the donor D to bind intramolecularly to the transition metal M is influenced by the length of Z. Suitable carboorganic substituents $R^{18}$ to $R^{29}$ are the same radicals as described for $R^1$–$R^{15}$ (apart from Z—D). Preference is here given to bridge lengths of from 1 to 3 and very particular preference is given to dimethylsilanediyl or substituted 1,2-ethanediyls and 1,3-propanediyls.

The substituents X are determined by the choice of corresponding metal starting compounds which are used for the synthesis of the metal complexes. Particularly useful substituents X are halogens such as fluorine, chlorine, bromine or iodine, in particular chlorine. Simple alkyl radicals such as methyl, ethyl, propyl, butyl, vinyl, allyl, phenyl or benzyl are also advantageous ligands X. Examples, which are by no means exhaustive, of further ligands X are trifluoroacetate, $BF_4^-$, $PF_6^-$ and also noncoordinating anions (see, for example, S. Strauss in Chem. Rev. 1993, 93, 927–942) such as $B(C_6F_5)_4^-$. The naming of the ligands X as anions does not imply a particular type of bonding to the transition metal M. If x is, for example, a noncoordinating or weakly coordinating anion, the interaction between the metal M and the ligand X tends to be electrostatic in nature. In contrast, if X is, for example, alkyl, the bond is covalent. The various types of bonding are known to those skilled in the art.

Amides, alkoxides, sulfonates, carboxylates and P-diketonates are particularly useful. Varying the radicals $R^{30}$ and $R^{31}$ makes it possible to make a fine adjustment in, for example, physical properties such as solubility. $R^{30}$ and $R^{31}$ are the same radicals as described for R1–$R^{15}$ (apart from Z—D). Preference is given to using $C_1$–$C_{10}$-alkyl such as methyl, ethyl, n-propyl, n-butyl, tert-butyl, n-pentyl, n-hexyl, n-heptyl, n-octyl and also vinyl, allyl, benzyl and phenyl as radicals $R^{30}$ and $R^{31}$. Some of these substituted ligands X are very particularly preferably used since they are obtainable from cheap and readily available starting materials. Thus, a particularly preferred embodiment is obtained when X is dimethylamide, methoxide, ethoxide, isopropoxide, phenoxide, naphthoxide, triflate, p-toluenesulfonate, acetate, acetylacetonate or 1,1,1,5,5,5-hexafluoroacetylacetonate.

The number n of the ligands x depends on the oxidation state of the transition metal M. The number n can thus not be given generally, but can assume different values for each particular transition metal. The oxidation states of the individual transition metals in catalytically active complexes are usually known to those skilled in the art. Thus, the appropriate complexes of titanium, of zirconium and of hafnium have, in particular, the oxidation states +3 and +4, chromium, molybdenum and tungsten are preferably present in the oxidation state +3, while iron and nickel are preferably used in the oxidation state +2. However, it is also possible to use complexes whose oxidation state does not correspond to that of the active catalyst. Such complexes can then be appropriately reduced or oxidized by means of suitable activators.

Possible transition metals M are, in particular, the elements of groups 3 to 8 of the Periodic Table and especially the elements of group 6 of the Periodic Table. Particularly useful central atoms in the transition metal complexes used according to the present invention are the elements scandium, yttrium, titanium, zirconium, hafnium, vanadium, chromium, molybdenum, tungsten, manganese, iron, cobalt, rhodium, nickel and palladium. Very particular preference is given to using complexes of chromium.

The preparation of various functional triazacycloalkane ligands has been known for a long time. Various synthetic routes for these complexing ligands are described, for example, in F. Weitl, K. Raymond JACS 101 (1979), 2728; M. Takahashi, S. Takamoto, Bull. Chem. Soc. Japan 50, (1977), 3413; T. Arishima, K. Hamada, S. Takamoto, Nippon Kagaku Kaishi, (1973), 1119; L. Christiansen, D. N. Hendrickson, H. Toftlund, S. R. Wilson, C. L. Xie, Inorg. Chem. 25,(1986), 2813; L. R. Gahan, G. A. Lawrence, A. M. Sargeson, Aust. J. Chem. 35,(1982), 1119; B. A. Sayer, J. P. Michael, R. D. Hancock, Inorg. Chim. Acta, 77,(1983), L63; K Wieghardt, U. Bossek, M. Guttmann, J. Weiss, Z. Naturforsch., 38b (1983), 81 and I. A. Fallis et al., Chem. Commun. 1998, 665–667.

The metal complexes, in particular the chromium complexes, can be obtained in a simple way by reacting the corresponding metal salts such as metal chlorides or metal carbonyls with the ligand (e.g. as described in P. Chaudhuri, K. Wieghardt, Prog. Inorg. Chem. 35,(1987), 329 or G. P. Stahley et al., Acta Crystall. C51,(1995), 18–20).

The process of the present invention for the polymerization of olefins can be combined with all industrially known polymerization methods at temperatures in the range from 20 to 300° C. and under pressures of from 1 to 4000 bar. The advantageous pressure and temperature ranges for carrying out the process accordingly depend strongly on the polymerization method. Thus, the catalyst systems used according to the present invention can be employed in all known polymerization processes, i.e., for example, in high-pressure polymerization processes in tube reactors or in autoclaves, in suspension polymerization processes, in solution polymerization processes or in gas-phase polymerization. in the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 280° C., in particular from 220 to 270° C. In low-pressure polymerization processes, it is usual to employ a temperature which is at least a few degrees below the softening temperature of the polymer. In particular, these polymerization processes are carried out at from 50 to 180° C., preferably from 70 to 120° C. Among the polymerization methods mentioned, particular preference is given according to the present invention to gas-phase polymerization, in particular in gas-phase fluidized-bed reactors, and to suspension polymerization, in particular in loop reactors and stirred tank reactors. The gas-phase polymerization can also be carried out in the condensed, supercondensed or supercritical mode. If desired, different or like polymerization processes can also be connected in series so as to form a polymerization cascade. Furthermore, an additive such as hydrogen can also be used in the polymerization processes to regulate the polymer properties.

The process of the present invention allows various olefinically unsaturated compounds to be polymerized. Here, polymerization includes copolymerization. In contrast to some known iron and cobalt complexes, the transition metal complexes used according to the present invention display good polymerization activities even toward higher α-olefins, so that their suitability for copolymerization deserves particular emphasis. Suitable olefins are ethylene and α-olefins having from 3 to 10 carbon atoms, for example propene, 1-butene, 1-pentene, 1-hexene, 1-heptene, 1-octene or 1-decene, and also internal olefins such as 2-pentene, 2-hexene, 3-hexene or norbornene and nonconjugated and conjugated dienes such as butadiene, 1,5-hexadiene or 1,6-beptadiene and polar monomers such as acrylic esters, acrolein, acrylonitrile, vinyl ethers, allyl ethers and vinyl acetate. Vinylaromatic compounds such as styrene can also be polymerized by the process of the present invention. Preference is given to polymerizing at least one olefin selected from the group consisting of ethene, propene, 1-butene, 1-pentene, 1-hexene, 1-heptene and 1-octene. In a preferred embodiment of the process of the present invention, mixtures of ethylene with $C_3$–$C_8$-α-olefins are used as monomers.

Some of the metal complexes mentioned as component (A) are themselves not polymerization-active or only slightly polymerization-active and are then brought into contact with an activator, namely the component (B), in order to be able to display good polymerization activity. Examples of suitable activator compounds are those of the aluminoxane type, in particular methylaluminoxane. Aluminoxanes are prepared, for example, by controlled addition of water to alkylaluminum compounds, in particular trimethylaluminum. Aluminoxane preparations suitable as cocatalyst are commercially available. It is assumed that these are a mixture of cyclic and linear compounds. The cyclic aluminoxanes can be represented by the formula $(R^{33}AlO)_k$ and the linear aluminoxanes can be represented by the formula $R^{33}(R^{33}AlO)_k$, where k indicates the degree of oligomerization and is a number from about 2 to 50. Advantageous aluminoxanes consist essentially of aluminoxane oligomers having a degree of oligomerization of from about 2 to 30 and $R^{33}$ is preferably a $C_1$–$C_6$-alkyl group, particularly preferably methyl, ethyl, butyl or isobutyl.

Apart from the aluminoxanes, further useful activator components are those which are used in the cationic activation of metallocene complexes. Such activator components are known, for example, from EP-B1-0468537 and from EP-B1-0427697. In particular, it is possible to use boranes or borates such as trialkylborane, triarylborane, dimethylanilinium tetraarylborate, trityl tetraarylborate, dimethylanilinium boratabenzenes or trityl boratabenzenes (see WO-A-97/36937) as activator compounds (B) of this type. Particular preference is given to using boranes or borates which bear at least two perfluorinated aryl radicals. Particularly suitable activator compounds (B) are compounds selected from the group consisting of aluminoxane, dimethylanilinium tetrakispentafluorophenylborate, trityl tetrakispentafluorophenylborate and trispentafluorophenylborane.

Further activator components which can be used are compounds such as aluminum alkyls, in particular trimethylaluminum, triethylaluminum, triisobutylaluminum, tributylaluminum, dimethylaluminum chloride, dimethylaluminum fluoride, methylaluminum dichloride, methylaluminum sesquichloride or diethylaluminum chloride, or aluminum trifluoride.

It is sometimes desirable to use a combination of various activators. This is known, for example, in the case of metallocenes where boranes and borates are often used in combination with an aluminum alkyl. A combination of various activator components with the transition metal complex of the present invention is generally also possible.

The amount of activator compound used depends on the type of activator. The nolar ratio of metal complex (A) to activator compound (B) can generally be from 1:0.1 to 1:10,000; preference is given to a ratio of from 1:1 to 1:1000. The molar ratio of metal complex (A) to dimethylanilinium tetrakispentafluorophenylborate, trityl tetrakispentafluorophenylborate or trispentafluorophenylborane is preferably from 1:1 to 1:20 and particularly preferably from 1:1 to 1:5, and to methylaluminoxane preferably from 1:1 to 1:3000 and particularly preferably from 1:10 to 1:500. It is also possible for the activator to react with the functional substituent or D to form a bond.

The transition metal complex can be brought into contact with the activator compound or compounds either before or after being brought into contact with the olefins to be polymerized. Preactivation using one or more activator compounds prior to mixing with the olefin and further addition of the same or other activator compounds after bringing this mixture into contact with the olefin is also possible. A preactivation is generally carried out at 10–100° C., preferably 20–80° C.

It is also possible for more than one of the transition metal complexes (A) of the present invention to be simultaneously brought into contact with the olefin to be polymerized. This has the advantage that a wider range of polymers can be produced in this way. For example, bimodal products can be produced.

A likewise broad range of products can be obtained by use of the complexes (A) in the presence of a catalyst (C) customary for the polymerization of olefins. Catalysts (C) which can be used for W this purpose are, in particular, classical Ziegler-Natta catalysts based on titanium, classical Phillips catalysts based on chromium oxides, metallocenes, constrained geometry complexes (see, for example, EP-A-416815 or EP-A-420436), nickel and palladium bisimine systems (for the preparation of these, see WO-A-98/03559), iron and cobalt pyridinebisimine compounds (for the preparation of these, see WO-A-98/27124) or chromium-pyrrole compounds (see, for example, EP-A-608447). This makes it possible, for example, to prepare bimodal products or generate comonomers in situ by means of such combinations.

The catalysts (A) of the present invention can also, if desired, be immobilized on an organic or inorganic support and be used in supported form in the polymerization. This is a customary method of avoiding deposits in the reactor and of controlling the polymer morphology. As support materials, preference is given to using silica gel, magnesium chloride, aluminum oxide, mesoporous materials, aluminosilicates and organic polymers such as polyethylene, polypropylene or polystyrene, in particular silica gel or magnesium chloride.

The activator compounds (B) and the polymerization catalyst (A) can be brought into contact with the support in various orders or simultaneously. This is generally carried out in an inert solvent which, after the immobilization, can be removed by filtration or evaporation. The use of supported catalysts which are still moist is also possible. Thus, the mixture of the support with the activator compound or compounds can be carried out first or the support can first be brought into contact with the polymerization catalyst. Preactivation of the catalyst using one or more activator compounds prior to mixing with the support is also possible. The amount of metal complex (A) (in rmnol) per gram of support material can vary greatly, e. g. in the range from 0.001 to 1 mmol/g. The preferred amount of metal complex (A) per gram of support material is from 0.001 to 0.5 mmol/g, particularly preferably from 0.005 to 0.1 mmol/g. In one possible embodiment, the metal complex (A) can also be prepared in the presence of the support material. A further method of immobilization is prepolymerization of the catalyst system with or without prior application to a support.

The process of the present invention allows polymers of olefins to be prepared. For the purposes of the present invention, the term polymerization encompasses both polymerization and oligomerization, i.e. oligomers and polymers having molecular weights in the range from about 56 to 3,000,000 can be produced by this process.

Owing to their good mechanical properties, the polymers prepared using the catalyst system of the present invention are especially suitable for producing films, fibers and moldings.

The catalysts of the present invention have good activities. Comparison of the polymerization results of N,N',N"-trimethyl 1,4,7-triazacyclononanechromium trichloride with those of an analogous compound bearing the additional donor-functionalized substituents gives the following surprising result: while the first-named catalyst gives only dimers, polymers having molecular weights around 200,000 are obtained when using the latter catalyst.

The following examples illustrate the invention.

All work was, unless otherwise indicated, carried out with exclusion of air and moisture. Toluene and tetrahydrofuran (THF) were dried by means of a molecular sieve column or sodium/benzophenone and distilled. Triisobutylaluminum TiRAl (2 M in heptane) was obtained from witco, MAO (methylaluminoxane, 10% in toluene) and N,N-dimethylanilinium tetrakis(pentafluorophenyl)borate (DMAB) were obtained from Albemarle, MAO (methylaluminoxane, 30% in toluene) was obtained from Witco GmbH, n-butyllithium (2.5M in hexane) was obtained from Aldrich and n-butyllithium (2.5M in hexane) was obtained from Acros.

The preparation of N-(1,4,7-triazacyclononanyl)-2-octan-2-ol was carried out as described by I. A. Fallis et al., Chem. Commun. 1998, 665–667.

EXAMPLE 1

Preparation of (1-(2-oxidooctyl)-1,4,7-triazacyclononanyl)chromium(III) dichloride 2 ml (3 mmol) of a solution of 1. 5M butyllithium in hexane were slowly added dropwise at −30° C. to a solution of 804 mg (3.12 mmol) of 1-(2-hydroxyoctyl)-1,4,7-triazacyclononane in THF over a period of 30 minutes. After addition was complete, the mixture was warmed to room temperature and 1105 mg (2.95 mmol) of $CrCl_3(THF)_3$ were then added. The reaction mixture was filtered through a short silica gel column and subsequently freed of all volatile constituents in an oilpump vacuum. This gave a pulverulent product in a yield of 75% (907 mg; 2.21 mmol).

EXAMPLE 2

2.1. Preparation of 1,3-didodecyl-5-(3-dimethylaminopropyl)-1,3,5-triazacyclohexane 10.7 g of dodecylamine (58 mmol) and 0.8 ml of 3-dimethylaminopropylamine (6.4 mnol) were dissolved in ethanol, after which 1.93 g of paraformaldehyde (64 mmol) were added and the mixture was stirred. The turbidity which developed was redissolved every now and again by addition of ether. After about 1 day, all the paraformaldehyde had dissolved. The solvent was subsequently removed on a rotary evaporator, the residue was dissolved in a little toluene and the product was then again freed of solvent under reduced pressure. This left 12.27 g of a viscous, colorless product which, according to NMR spectroscopy, consisted of about 75 mol % of 1,3,5-tridodecyl-1,3,5-triazacyclohexane and 25 mol % of 1,3-didodecyl-5-(3-dimethylaminopropyl)-1,3,5-triazacyclohexane and toluene.

Ligand Mixture:

13C-NMR (50 HHz, $CDCl_3$): δ 74.5 (ring $CH_2$), 57.6, 50.5 ($NCH_2$ (amine)), 52.6 ($NCH_2$ (dodecyl)), 45.3 ($NMe_2$), 31.7, 29.3–29.6, 27.4, 27.3, 22.6 ($CH_2$), 19.9 (Me (methyl))

2.2. Preparation of 1,3-didodecyl-5-(3-dimethylaminopropyl)-1,3,5-triazacyclohexane-chromium trichloride 11.85 g of the above mixture (96.6%) were dissolved in 300 ml of toluene, and 3.24 g of $CrCl_3$ (20.5 mmol) were subsequently added. After distilling off 50 ml of toluene, 0.3 g of Zn powder was added. The solvent was then removed by distillation and the residue was washed with ether. Further purification was carried out by column chromatography over silica gel. Elution was first carried out using chloroform and 11 g of 1,3,5-tridodecyl-1,3,5-triazacyclohexanechromium trichloride (14.7 mmol, 95% of theory) were obtained, after which the eluent was changed to acetone and 1.2 g of 1,3-didodecyl-5-(3-dimethylaminopropyl)-1,3,5-triazacyclohexane-chromium trichloride (1.8 mmol, 30%) were obtained.

EXAMPLE 3

3. 1. Preparation of 1,3-diethyl-5-(2-cyanoethyl)-1,3,5-triazacyclohexane

Method I:

1 ml of 3-aminopropionitrile (14 ruol) was dissolved in 80 ml of 1,3,5-triethyl-1,3,5-triazacyclohexane (0.4 mol) and the solution was heated at 130° C. for 12 hours. After distilling off the excess 1,3,5-triethyl-1,3,5-triazacyclohexane at 70° C./1.3 Pa, 2.2 g of crude product were obtained. This was dissolved in 50 ml of ether and filtered through a short silica gel column. Removing the solvent under reduced pressure left 1.9 g (69%) of a colorless oil.

Method II:

9 ml of 3-aminopropionitrile (130 mool) and 100 ml of ethylamine (70% strength in water, 1.2 mol) were dissolved in 200 ml of ethanol, then 40 g of paraformaldehyde (1.33 mol) were added and the mixture was stirred. After dissolution of the paraformaldehyde and cooling to room temperature, the solvent was removed, the residue was dissolved in 50 ml of ether and filtered through a short silica gel column. Removal of the solvent under reduced pressure left 20 g (78%) of a colorless oil.

MS (70 eV, 23° C.): 196 (M$^+$, 8%), 195 ((M–H)+, 11%), 139 ((M–(H$_2$C=NEt (Et: ethyl)))$^+$, 27%)

1H-NMR (200 MHz, CDCl$_3$): δ 3.3, 3.2br (6H, ring CH$_2$), 2.9t (2H, CH$_2$CH$_2$CN), 2.4 t (2H, CH$_2$CH$_2$CN), 2.2 q (4H, CH$_2$Me), 0.9t (6H, CH2Me)

13C-NMR (50 MHz, CDCl$_3$): δ 118.7 (CN), 74.5, 73.1 (ring CH$_2$), 48.3 (CH$_2$CH$_2$CN), 46.1 (CH$_2$Me), 17.5 (CH$_2$CH$_2$CN), 12.1 (CH$_2$Me)

IR (KBr, v/cm$^{-1}$): 649m, 805m, 10089, 1045s, 1104m, 1122m, 1146w, 1189m, 1215m, 1292s, 1356m, 1379m, 1454B, 1470s, 2247m, 2642m, 2790s, 2806s, 28749, 2936s, 2969s

3.2. Preparation of 1,3-diethyl-5-(2-cyanoethyl)-1,3,5-triazacyclohexanechromium trichloride 2.2 g (11.2 mmol) of 1,3-diethyl-5-(2-cyanoethyl)-1,3,5-triazacyclohexane and 4. 0 g of CrCl$_3$(THF)$_3$ (11 mmol) were stirred in 40 ml of THP. After 1 hour, the solvent was removed under reduced pressure, fresh THF was added twice and removed under reduced pressure, and the residue was then washed with ether and dried under reduced pressure. This gave 1.9 g of violet 1,3-diethyl-5-(2-cyanoethyl)-1,3,5-triazacyclohexanechromium trichloride (88%), melting point: 246–248° C.

Elemental analysis (calc.): C 34.0 (33.9), H 6.0 (5.7), N 15.0 (15. 8), Cl 26.4 (30.0)

IR (KBr, v/cm$^{-1}$): 423m, 431m, 504m, 508m, 516m, 531w, 547m, 602m, 763m, 793m, 924w, 964m, 983s, 1006s, 1020s, 1086m, 1097m, 1121w, 1141s, 1170s, 1202m, 1245s, 1270s, 1292s, 1303s, 1323s, 1331s, 1348s, 1377s, 1391s, 1414m, 1462m, 1486s, 1639s, 2254m, 2887s, 2953s, 2983s, 3390s

EXAMPLE 4

4.1. Preparation of 1,3-didodecyl-5-(2-hydroxyethyl)-1,3,5-triazacyclohexane 48 g of dodecylamine (259 mmol) and 1.7 ml of ethanolamine (29 mmol) were dissolved in 100 ml of ethanol, after which 8.6 g of paraformaldehyde (287 mmol) were added and the mixture was stirred. The turbidity caused by 1,3,5-tridodecyl-1,3,5-triazacyclohexane was redissolved every now and again by addition of ether. After about 1 day, all the paraformaldehyde had dissolved. The solvent was then removed on a rotary evaporator, the residue was dissolved in a little toluene and the product was then again freed of solvent under reduced pressure. This left 55 g of a viscous colorless product which, according to NMR spectroscopy, consisted of about 75 mol % of 1,3,5-tridodecyl-1,3,5-triazacyclohexane and 25 mol % of 1,3-didodecyl-5-(2-hydroxyethyl)-1,3,5-triazacyclohexane and a little toluene.

4.2. Preparation of 1,3-didodecyl-5-(2-oxidoethyl)-1,3,5-triazacyclohexanechromium dichloride 2.6 g of the above mixture were reacted with 0.7 g of CrCl$_3$ (4.4 mmol) in toluene and 0.3 g of Zn powder as described under 2.2. After 2 hours, 50 ml of THF were added, the mixture was again heated to boiling and then stirred for 2 days. After removing the solvent and washing with ether, the green-violet residue was purified by column chromatography over silica gel. Elution was first carried out using dichloromethane and 590 mg of 1,3,5-tridodecyl-1,3,5-triazacyclohexanechromium trichloride (0.8 mmol) were obtained, after which the eluent was changed to acetone and 1.8 g of green 1,3-didodecyl-5-(2-oxidoethyl)-1,3,5-triazacyclohexanechromium dichloride product (3.1 mmol, 70%) were obtained. To purify the green product, it was dissolved in hexane and reprecipitated by cooling to −200° C.

EXAMPLE 5

5.1. Preparation of 1,3-didodecyl-5-(2-dimethylaminoethyl)-1,3,5-triazacyclohexane (5.1.a) and 1-dodecyl-3,5-bis(2-dimethylaminoethyl)-1,3,5-triazacyclohexane (5.1.b)

20.16 g of dodecylamine (109 mmol) and 5.9 ml of dimethylaminoethylamine (54 mmol) were dissolved in ethanol, then 4.90 g of paraformaldehyde (163 1mol) were added and the mixture was stirred. After about 1 day, all the paraformaldehyde had dissolved. The solvent was then removed on a rotary evaporator, the residue was dissolved in a little toluene and was then again freed of solvent under reduced pressure.

5.2. Preparation of 1,3-didodecyl-5-(2-dimethylaminoethyl)-1,3,5-triazacyclohexane-chromium trichloride (5.2.a) and 1-dodecyl-3,5-bis(2-dimethylaminoethyl)-1,3,5-triazacyclohexane-chromium trichloride (5.2.b)

The above mixture was reacted with 8.2 g of CrCl$_3$ (52 mmol) and 0.45 g of Zn powder as described under 2.2. After removing the solvent and washing with ether, the residue was extracted a number of times with acetone (solution A) and then with chloroform (solution B).

The solvent was removed from solution A under reduced pressure and the residue was chromatographed on silica gel. Elution was first carried out using chloroform and 3.9 g of (A1) were obtained, then using acetone to give 3.62 g of (A2) and using acetone/triethylamine to give a further 2.40 g of (A3). (A1) was chromatographed together with solution B on silica gel. Elution was first carried out using chloroform and 12.12 g of 1,3,5-tridodecyl-1,3,5-triazacyclohexanechromium trichloride (16 mmol) were obtained, then using acetone to give 3.96 g of (B2). (A2) was again purified by chromatography using acetone and 2.11 g of (C$_2$) were obtained. (A3) was, after removing the solvent, separated chromatographically using acetone into 400 mg of (D2) and then 1.28 g of (D3). The fractions (B2), (C2) and (D2) were combined and again purified by chromatography using acetone, then dissolved in a little toluene, freed of solvent under reduced pressure, washed with pentane and again dried under reduced pressure. This gave 4.84 g of 1,3-didodecyl-5-(2-dimethylaminoethyl)-1,3,5-triazacyclohexane- chromium trichloride (5.2.a) (7.4 mmol). The fraction (D3) was purified by chromatographing it again using acetone and 1.06 g of 1-dodecyl-3,5-bis(2-dimethylaminoethyl)-1,3,5-triazacyclohexane-chromium trichloride (5.2.b) (1.9 mmol) were obtained.

EXAMPLE 6

Preparation of 1,3,5-tris(3-(3-ethylhexyloxy)propyl)-1,3,5-triazacyclohexane The preparation was carried out by a method analagous to that described in C. W. Hoerr et. al. J. Am. Chem. Soc.

78,(1956), 4667–4670,using 3-(3-ethylhexyloxy) propylamine in place of dodecylamine.

1H-NMR (200 MHz, CDCl$_3$): δ 3.3t (6H, OCH$_2$), 3.2br (6H, OCH$_2$), 3.2br (6H, ring (H$_2$), 2.3t (6H, NCH$_2$), 1.0–1.6 (33H, CH, CH$_2$), 0.7t (12H, Me)

13C-NMR (50 MHz, toluene): δ 73.7 (ring CH$_2$), 72.4, 67.9 (OCH$_2$), 48.4 (NCH$_2$), 39.0 (CH), 30.0, 28.4, 27.4, 23.2, 22.3 (CH$_2$), 13.2, 10.3 (me)

EXAMPLE 7

Preparation of 1,3,5-tris(3-(2-methoxyethoxy) propyl)-1,3,5-triazacyclohexane

The preparation was carried out by a method analogous to that described by C. W. Hoerr et. al., J. Am. Chem. Soc. 78,(1956), 4667–4670,using 3-propylamino-2-methoxyethyl ether in place of dodecylamine.

1H-NMR (200 MHz, CDCl$_3$): δ 3.35–3.50 (18H, OCH$_2$), 3.30 (9H, OCH$_3$), 3.2br (6H, ring CH$_2$), 2.4t (6H, NCH$_2$), 1.6t (6H, C—CH$_2$—C)

13C-NMR (50 MHz, CDCl$_3$): δ 74.3 (ring CR$_2$), 71.6, 69.8, 69.3 (OCH$_2$), 58.7 (OCH$_3$), 49.2 (NCH$_2$), 27.4 (C—CH$_2$—C)

EXAMPLE 8

8.1 Preparation of 1,3-dimethyl-5-(2-hydroxyethyl)-1,3,5-triazacyclohexane 1 ml of ethanolamine (17 mmol) was dissolved in 80 ml of 1,3,5-trimethyl-1,3,5-triazacyclohexane and heated at 130° C. for 12 hours (gas evolution). After distilling off the excess 1,3,5-trimethyl-1,3,5-triazacyclohexane (60° C./0.01 torr), 2 g of crude product were obtained. 10 ml of methylamine (40% in water) were added, the mixture was stirred for 12 hours and volatiles were then again removed under reduced pressure. The residue was vaporized and recondensed under reduced pressure by brief heating with a Bunsen burner.

Yield: 1.2 g (46%) of a colorless oil.

1H NHR (CDCl$_3$, 200 MHz): 5.35br (1H, HO), 3.50t (2H, HOCH$_2$), 3.14br (6H, NCH$_2$N), 2.79t (2H, NCH$_2$), 1.97s (6H, NMe$_2$)

Using a method analogous to Example 8.1., 1 ml of ethanolamine (17 mmol) and 80 ml of 1,3,5-triethyl-1,3,5-triazacyclohexane were used to prepare 1.4 g of 1,3-diethyl-5-(2-hydroxyethyl)-1,3,5-triazacyclohexane:

1H NMR (CDCl$_3$, 200 MHz): 5.74br (1H, HO), 3.62t (2H, CH$_2$OH), 3.29br (6H, NCH$_2$N), 2.85t (2H, NCH$_2$CH$_2$OH), 2.24t (4H, NCH$_2$CH$_3$), 0.99q (4R, NCH$_2$CH$_3$).

8.2. Preparation of 1,3-dimethyl-5-(2-oxidoethyl)-1,3,5-triazacyclohexanechromium dichloride 40 ml of THF were condensed onto 1.0 g of 1,3-dimethyl-5-(2-hydroxyethyl)-l,3,5-triazacyclohexane (7.7 mmol) and 2.8 g of CrCl$_3$(THF)$_3$ (7.5 mmol). The suspension was stirred at room temperature until it became green. After removal of the solvent under reduced pressure, another 40 ml of THF were condensed onto the residue and the green suspension was stirred for 1 hour. After again removing the THF, washing twice with ether and drying under reduced pressure, 1.4 g (91%) of light-green 1,3-dimethyl-5-(2-oxidoethyl)-1,3,5-triazacyclohexanechromium dichloride product were obtained.

IR (KBr, v/cm$^{-1}$): 3226m, 2941s, 2899m, 2856m, 2789s, 2729m, 2687m, W 2650m, 2604m, 1468w, 1445w, 1429w, 1385m, 1335w, 1258m, 1234s, 1203w, 1147s, 1108s, 1055m, 1034m, 1003s, 983w, 961w, 944w, 917s, 899m, 862w, 837w, 795w, 655w, 616w

EXAMPLE 9 to 21

Polymerizations

A solution of the complex indicated in Table 1 in 250 ml of toluene was admixed with the appropriate amount of MAO (10% strength solution in toluene). In the case of activation using DMAB N,N-dimethylanilinium tetrakis (pentafluorophenyl)borate, the amount of DMAB indicated in Table 1 was added, the mixture was heated to 70° C., then admixed with TiBAl (see Tab. 1) and the resulting solution was again brought to 40° C. The polymerization was started by passing in ethylene at a flow rate of from about 20 to 40 l/h at atmospheric pressure at 40° C. After the time indicated in Table 1 under a constant ethylene flow, the polymerization was stopped by addition of methanolic HCl solution (15 ml of concentrated hydrochloric acid in 50 ml of methanol). 250 ml of methanol were subsequently added and the white polymer formed was filtered off, washed with methanol and dried at 70° C.

Polymerization data and the corresponding product properties are shown in Table 1.

The comonomer content of the polymer (% C$_6$) and its methyl side chain content per 1000 carbon atoms of the polymer chain (CH$_3$/1000) were determined by IR spectroscopy.

The η value was determined at 130° C. by means of an automatic Ubbelohde viscometer (Lauda PVS 1) using decalin as solvent (ISO1628 at 130° C., 0.001 g/ml of decalin).

The molar mass distributions and the means Mn, Mw and Mw/Mn derived therefrom were determined by means of high-temperature gel permeation chromatography using a method based on DIN 55672 under the following conditions: solvent: 1,2,4-trichlorobenzene, flow: 1 ml/min, temperature; 140° C., calibration using PE standards.

Abbreviations in Table 1:

$M_w$ weight average molecular weight $M_n$ number average molecular weight

Q polydispersity (ratio of $M_w$ to $M_n$)

m.p. melting point of the polymer n Staudinger index (viscosity)

CH$_3$/1000 number of methyl side chains per 1000 carbon atoms

TABLE 1

Polymerization data and polymer analyses

| Ex. | Comp.[a] | Amount[b] [mg] (μmol) | MAO [mmol] | Al:Cr | Cr:B[c] | Activity kg/mol Cr·h | Yield [g] (min)[d] | η [dl/g] | Mw [g/mol] | Q | m.p. [°C.] | Total CH₃ [/1000C] |
|---|---|---|---|---|---|---|---|---|---|---|---|---|
| 9  | 1.    | 6.2 (15)    | 5     | 330:1  | —     | 680 | 10.2 (60) |      | 205282 | 3.93 | 129   |     |
| 10 | 1.    | 4.1 (10)    | 5     | 500:1  | —     | 850 | 8.5 (60)  |      | 139792 | 2.75 | 131   |     |
| 11 | 2.2.  | 22.1 (33.1) | 11.6  | 350:1  | —     | 165 | 5.5 (60)  | 2.71 |        |      | 127.9 | 6.4 |
| 12 | 3.2.  | 15.8 (24.1) | 8.44  | 700:1  | —     | 20  | 0.51 (60) | 1.27 |        |      | 133.9 | 5.7 |
| 13 | 3.2.  | 14.1 (21.5) | 21.5  | 1000:1 | —     | 91  | 1.96 (60) | 2.75 |        |      | 138.0 | 4.7 |
| 14 | 4.2.  | 10.0 (17.5) | 6.12  | 220:1  | —     | 5   | 0.25 (60) | 2.22 |        |      |       | 9.2 |
| 15 | 4.2.  | 21.8 (38.0) | 19.0  | 500:1  | 2.1:1 | 9   | 0.35 (60) | —    |        |      |       | <1  |
| 16 | 5.2.a | 13.6 (23.3) | 8.2   | 500;1  | —     | 17  | 0.4 (60)  | 1.61 |        |      | 133   | 2.6 |
| 17 | 5.2.b | 17.0 (26.0) | 9.1   | 350:1  | —     | 185 | 4.8 (60)  | 0.58 |        |      | 127.6 | 5.6 |
| 18 | 6.    | 20 (26.8)   | 7.28  | 720:1  | —     | 0   | 0 (60)    | —    |        |      | —     | —   |
| 19 | 7.    | 23.5 (39.5) | 30.45 | 1000:1 | —     | 8   | 0.47 (90) | 2.77 |        |      | 126.1 | 8   |
| 20 | 8.    | 5.9 (21.2)  | 7.45  | 351:1  | —     | 11  | 0.24 (60) | 1.13 | 46729  | 3.96 | 134.8 | 1.8 |
| 21 | 8.    | 6.0 (21.6)  | —     | 20:1   | 1:1.4 | 78  | 1.68 (60) | 1.61 | 36659  | 8.59 | 132   | 5.3 |

[a] Comp. = Compound (transition metal complex corresponding to example number)
[b] Amount of the compound
[c] Activation carried out by addition of DMAB and TiBAl
[d] Polymerization time
The polymerization was carried out at 40° C.

We claim:

1. A process for the polymerization of olefins, which comprises carrying out the polymerization in the presence of catalysts comprising the following components:
   (A) at least one complex of a transition metal with a tridentate macrocyclic ligand which bears at least one substituent having a donor function and
   (B) an aluminoxane.

2. A process as claimed in claim 1, wherein the component (A) is a compound of the formula I

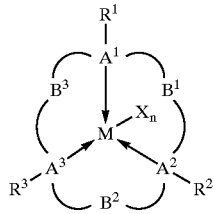

I where the variables have the following meanings:

M is a transition metal of groups 3 to 12 of the Periodic Table,

B¹—B³ are each a divalent radical selected from the group consisting of

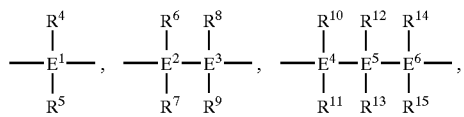

where

E¹—E⁶ are silicon or carbon and not more than two of E⁴-E6 are silicon,

A¹—A³ are nitrogen or phosphorus,

R¹—R¹⁵ are hydrogen, $C_1$–$C_{20}$-alkyl, 5- to 7-membered cycloalkyl which may in turn bear a $C_6$–$C_{10}$-aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{32}_3$ or a radical of the formula —Z—D, where the organic radicals R¹—R¹⁵ may be substituted by halogen(s) and any two geminal or vicinal radicals R¹—R¹⁵ may also be joined to form a five or six-membered ring, and at least one of the radicals R¹—R¹⁵ is a radical —Z—D, where D is $NR^{16}R^{17}$, $NR^{16}$, $OR^{16}$, O, $SR^{16}$, S, $PR^{16}R^{17}$, $SO_3R^{16}$, $OC(O)R^{16}$, $CO_2$, $C(O)R^{16}$, $C(NR^{16})R^{17}$, CN or a five- or six-membered heterocyclic ring system, where the radicals R¹⁶—R¹⁷ may also be joined to Z to form a five- or six-membered ring;

Z is a divalent radical selected from the group consisting of:

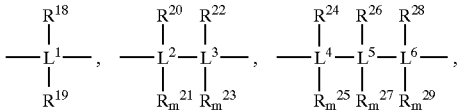

where

L¹—L⁶ are silicon or carbon, not more than two of L⁴—L⁶ are silicon and m=0 if any two of the vicinal radicals R²⁰, R²², R²⁴, R²⁶ and R²⁸ form an aromatic ring or a double bond is formed between two adjacent L²—L⁶, and otherwise m=1, X are, independently of one another, fluorine, chlorine, bromine, iodine, hydrogen, $C_1$–$C_{10}$-alkyl, $C_2$–$C_{10}$-alkenyl, $C_6$–$C_{20}$-aryl, alkylaryl having 1–10 carbon atoms in the alkyl part and 6–20 carbon atoms in the aryl part, $NR^{30}R^{31}$, $OR^{30}$, $SR^{30}$, $SO_3R^{30}$, $OC(O)R^{30}$, CN, SCN, =O, b-diketonate, $BF_4^-$, $PF_6^-$ or bulky noncoordinating anions, R¹⁶—R³¹ are hydrogen, $C_1$–$C_{20}$-alkyl, 5-to 7-membered cycloalkyl which may in turn bear a $C_6$–$C_{10}$-aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{32}_3$, where the organic radicals R¹⁶—R³¹ may be substituted by halogen(s) and any two geminal or vicinal radicals R¹⁶—R³¹ may also be joined to form a five- or six-membered ring, $R^{32}$ are, independently of one another, hydrogen, $C_1$–$C_{20}$-alkyl, 5- to 7-membered cycloalkyl which may in turn bear a $C_6$–$C_{10}$-aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part and any two geminal radicals $R^{32}$ may also be joined to form a five- or six-membered ring, is a number from 1 to 4 which corresponds to the oxidation state of M or, if D is covalently bound to the metal center M, the oxidation state of M minus the number of groups D covalently bound to M, and, furthermore, the value of n is reduced by 1 for each X=oxygen.

3. A process as claimed in claim 2, wherein only $R^1$ is a radical —Z—D.

4. A process as claimed in claim 2, wherein $B^1$, $B^2$ and $B^3$ are identical.

5. A process as claimed in claim 2, wherein D is oxygen, $NR^{16}$, $NR^{16}R^{17}$ or CN.

6. A process as claimed in claim 1, wherein the transition metal M comes from groups 3 to 8 of the Periodic Table.

7. A process as claimed in claim 1, wherein the transition metal M comes from group 6 of the Periodic Table.

8. A process as claimed in claim 1, wherein at least one olefin selected from the group consisting of ethene, propene, 1-butene, 1-pentene, 1-hexene, 1-heptene or 1-octene is polymerized.

9. A process as claimed in claim 1, wherein the polymerization is carried out in suspension or in the gas phase.

10. A process as claimed in claim 1, wherein at least one metal complex (A) in the presence of at least one catalyst (C) customary for the polymerization of olefins and an aluminoxane (B) is used.

11. A catalyst system comprising the following components:

(a) at least one transition metal complex (A) as defined in claim 1 and (b) at least one aluminoxane (B).

* * * * *

UNITED STATES PATENT AND TRADEMARK OFFICE
CERTIFICATE OF CORRECTION

PATENT NO.    : 6,803,431 B1
DATED         : October 12, 2004
INVENTOR(S)   : Mithan et al.

It is certified that error appears in the above-identified patent and that said Letters Patent is hereby corrected as shown below:

Column 17,
Line 8, "is a number from 1 to 4" should read -- n is a number from 1 to 4 --.

Signed and Sealed this

Twenty-ninth Day of March, 2005

JON W. DUDAS
*Director of the United States Patent and Trademark Office*